United States Patent [19]

Voronkova et al.

[11] 4,239,875
[45] Dec. 16, 1980

[54] METHOD FOR PRODUCING PREPOLYMERS BASED ON VINYL MONOMERS

[76] Inventors: Irina A. Voronkova, prospekt Tsiolkovskogo, 47, kv.10, Dzerzhinsk Gorkovskoi oblasti; Tatyana I. Radbil, Kuznechikha-1, 3, kv. 8, Gorky; Nikolai A. Mikhalev, prospekt Tsiolkovskogo, 79a, kv. 64, Dzerzhinsk Gorkovskoi oblasti; Boris P. Shtarkman, prospekt Lenina, 65, kv. 63, Dzerzhinsk Gorkovskoi oblasti; Valery A. Fomin, ulitsa Pirogova, 16b, kv. 12, Dzerzhinsk Gorkovskoi oblasti; Volf S. Etlis, prospekt Dzerzhinskogo, 4, kv. 46, Dzerzhinsk Gorkovskoi oblasti, all of U.S.S.R.

[21] Appl. No.: 761,899

[22] Filed: Jan. 24, 1977

[51] Int. Cl.$^3$ .......................... C08F 2/00; C08F 4/34; C08F 220/14
[52] U.S. Cl. ...................... 526/214; 526/75; 526/216; 526/224; 526/227; 526/232; 526/328; 526/329.5; 526/346; 526/329.2
[58] Field of Search ................ 526/214, 216, 224, 64, 526/75, 227, 232; 260/45.85 H, 45.7 S, 45.85 S, 45.85 NT

[56] References Cited

U.S. PATENT DOCUMENTS

| | | | |
|---|---|---|---|
| 3,154,600 | 10/1964 | Monn | 260/884 |
| 3,234,303 | 2/1966 | Bild et al. | 260/29.6 R |
| 3,364,182 | 1/1968 | Griffith | 526/224 |
| 3,503,924 | 3/1970 | Pollock | 260/45.85 H |
| 3,637,545 | 1/1972 | Fivel | 526/224 |
| 3,801,541 | 4/1974 | Hofmann | 260/45.85 H |
| 4,110,526 | 8/1978 | Hamada et al. | 526/214 |

FOREIGN PATENT DOCUMENTS 870191 6/1961 United Kingdom .
1286600 8/1972 United Kingdom .

OTHER PUBLICATIONS

Derwent 13383/68 "Methyl Methacrylate Polymer," (JA61200/64), Jun. 6, 1968.
Derwent 752445-A, "Stable Methyl Methacrylate Prep," (JA045889), Mar. 3, 1967.
Derwent 71898A/40, "Ageing Stable Prepol," (SU56-2-094), Jul. 11, 1974.
Derwent 1498/68, "Methyl Methacrylate Polymer," 54723/63JA, 10/16/63.
Derwent 22246Y/13, "Instiat System," (DT2642-660), Sep. 22, 1975.

Primary Examiner—Joseph L. Schofer
Assistant Examiner—Herbert J. Lilling
Attorney, Agent, or Firm—Lackenbach, Lilling & Siegel

[57] ABSTRACT

The present invention relates to a method for producing prepolymers based on vinyl monomers such as methacrylic acid esters, or a mixture of esters of methacrylic and acrylic acids, or styrene, or a mixture of styrene with methacrylic acid esters. The method consists in conducting mass polymerization of said vinyl monomers at a temperature of 90° to 160° C. in air, or in oxygen-enriched air, or in an inert gas medium in the presence of an initiating system. The system is made of a mixture consisting of:

(1) peresters of the general formula

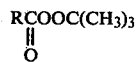

where R is aryl, alkyl, isoalkyl, methyl carbitol, phenyl carbitol or benzyl carbitol in an amount of 0.05–0.3 wt. parts per 100 wt. parts of a vinyl monomer and (2) the following components:

(a) sulfur-containing organic acids with bivalent sulfur in an amount of 0.2–3.0 wt. parts per 100 wt. parts of a vinyl monomer, or (b) esters of sulfur-containing organic acids with bivalent sulfur in an amount of 0.2–3.0 wt. parts per 100 wt. parts of a vinyl monomer, or (c) a mixture of mercaptans with 4 to 20 carbon atoms in the chain and sulfur-containing organic acids in an amount of 0.3–2.5 wt. parts per 100 wt. parts of a vinyl monomer, taken in a weight ratio of 0.1–0.5:0.2–2 respectively, or (d) mixture of mercaptans with 4 to 20 carbon atoms in the chain and fatty acids with 14 to 20 carbon atoms in the chain in an amount of 0.3–2.5 wt. parts per 100 wt. parts of a vinyl monomer taken in a weight ratio of 0.1–0.5 : 0.2–2 respectively.

7 Claims, No Drawings

METHOD FOR PRODUCING PREPOLYMERS BASED ON VINYL MONOMERS

The present invention relates to methods for producing prepolymers based on vinyl monomers—methacrylic acid esters, or a mixture of esters of methacrylic and acrylic acids, or styrene, or a mixture of styrene with methacrylic acid esters. The prepolymers thus produced can be used for impregnating glass fiber and wood when making structural materials, for the production of organic glass sheets by mass polymerization, as well as for the production of injection moulding and extrusion grade granules.

Known in the art are methods for producing prepolymers based on vinyl monomers—methacrylic acid esters or a mixture of esters of methacrylic and acrylic acids, or styrene, or a mixture of styrene with methacrylic acid esters by mass polymerization of methacrylic acid esters, or a mixture of esters of methacrylic and acrylic acids, or styrene, or a mixture of styrene with methacrylic acid esters at elevated temperatures ranging from 90° to 160° C. in air in the presence of a polymerization initiator and a molecular weight regulator. Benzoyl peroxide, lauryl peroxide, tertbutyl peracetate, tert.-butyl peroxide, tert.-butyl hydroperoxide, or asobisisobutyronitrile are used as the initiator, whereas n-butyl-, octyl-, dodecyl- or 2-ethylhexylmercaptan are used as the molecular weight regulator.

All the known and available methods for producing prepolymers on the basis of vinyl monomers are based on rapid decomposition of the initiator.

Relatively low rates of the monomer conversion, or difficult process control in case of high conversion degrees, or producing prepolymers with a limited range of molecular weights are however, disadvantages of all these methods. Besides, introduction of an inhibitor in the finished prepolymer is required for certain methods in order to prevent its polymerization during storage. This operation necessitates installation of additional equipment, thus complicating the whole process.

A method is known to produce prepolymers based on methacrylic acid esters by mass polymerization of said esters at a temperature of 65° to 105° C. in nitrogen atmosphere without an initiator and in the presence of the molecular weight regulator being present.

Long polymerization cycles are necessary (from 100 to 380 min), when a sufficiently high conversion degree is required, a disadvantage of this method.

It is an object of the present invention to provide a method for producing prepolymers based on the above-cited vinyl monomers, which will make it possible to carry out an easily controlled polymerization process with any conversion degrees.

Another object of the present invention is to provide a method for producing prepolymers, which will make it possible to carry out polymerization at a high speed.

It is also an object of the present invention to provide a method which will make it possible to produce stable prepolymers with any specified conversion degree and required molecular weight over a wide range of its values.

In accordance with these and other objects, the present invention resides in the provision of a method for producing prepolymers based on vinyl monomer—methacrylic acid esters, or a mixture of esters of methacrylic and acrylic acids, or styrene, or a mixture of styrene with methacrylic acid esters by mass polymerization of vinyl monomers—methacrylic acid esters, or a mixture of esters of methacrylic and acrylic acids, or styrene, or a mixture of styrene with methacrylic acid esters at a temperature of 90° to 160° C. in air or in oxygen-enriched air, or in an inert gas medium; in accordance with the invention, polymerization being conducted, in the presence of an initiating system consisting of:

(1) peresters of the general formula

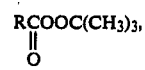

where R is aryl, alkyl, isoalkyl, methyl carbitol, phenyl carbitol or benzyl carbitol in an amount of 0.05–0.3 wt. parts per 100 wt. parts of a vinyl monomer and (2) the following components:

(a) sulfur-containing acids with bivalent sulfur in an amount of 0.2–3.0 wt. parts per 100 wt. parts of a vinyl monomer, or (b) esters of sulfur-containing acids with bivalent sulfur in an amount of 0.2–3.0 wt. parts per 100 wt. parts of a vinyl monomer, or (c) a mixture of mercaptans, having a $C_4$–$C_{20}$ hydrocarbon chain length, with sulfur-containing acids in an amount of 0.3–2.5 wt. parts per 100 wt. parts of a vinyl monomer, taken in a weight ratio of 0.1–0.5:0.2–2, respectively, or (d) a mixture of mercaptans with 4 to 20 carbon atoms in the chain andfatty acids with 14 to 22 carbon atoms in the chain, in an amount of 0.3–2.5 wt. parts per 100 wt. parts of a vinyl monomer, taken in a weight ratio of 0.1–0.5:0.2–2 respectively.

Easy control of the polymerization process is made possible with any conversion degrees (on the order of 15–80%) due to the use of said initiating system in the method proposed. Polymerization can be conducted at a high speed (polymerization cycle ranges from 12 to 15 min.). Besides, it becomes possible to produce prepolymers with a wide range of molecular weights (20000–250000). The prepolymers produced are stable under storage and at elevated temperatures (for example, no change in the characteristics of the prepolymers was observed when having kept same for 3–4 hours at 140° C.).

The speed of the polymerization process can be easily regulated by selecting appropriate process conditions (various ratios of the initiating system components and temperature) resulting in a desirable conversion degree of the monomers and molecular weight of the prepolymers. This occurs due to the formation of inhibitors in definite amounts (during polymerization) in any of the initiating systems, each having a particular different composition. Said inhibitors drastically retard the polymerization rate and stop the process when the specified monomer conversion degree and the prepolymer molecular weight have been reached.

The same inhibitors also ensure stability of the produced prepolymers under storage and at elevated temperatures.

Residence time of the material being polymerized in the prepolymerization reactor and temperature variations (in any direction) do not practically affect the prepolymer characteristics due to a specific feature of the process kinetics governed by the use of the above-said initiating system. Besides, short shutdowns of the prepolymerization reactor followed by its rapid start-up are also permissible due to the specific process kinetics. The polymerization process can be conducted in conventional equipment, for instance, in a coil-type heat exchanger, and it does not require any sophisticated automation system.

The herein-proposed method for producing prepolymers based on the aforesaid vinyl monomers can be realized both in a batch and in a continuous process. A continuous process for producing said prepolymers in air is described below.

A reaction mixture consisting of a monomer and an initiating system is continuously metered into a prepolymerization reactor (coil-type heat exchanger) heated up to a definite temperature. The mass polymerization process is conducted at a certain speed until a prepolymer with specified characteristics is produced. The produced prepolymer is either continuously discharged into storage vessels after having been precooled down to room temperature, or fed into a polymerization reactor to produce polymeric items such as granules, pipes and tubes, sheets, etc.

This invention will be best understood from a consideration of the following examples illustrating the proposed method for producing prepolymers based on vinyl monomers.

In Examples 1-34 polymerization is conducted in air, in Examples 35 and 36—in oxygen-enriched air, and in Examples 37 and 38—in an inert gas medium.

EXAMPLE 1

0.1 wt. part of tert.-butyl perbenzoate, 0.3 wt. parts of lauryl mercaptan and 1.0 wt. part of stearic acid are added to 100 wt. parts of methyl methacrylate. The mixture is continuously fed under a pressure of 10 kgf/cm$^2$ and at a rate of 10 l/h into a tubular reactor heated up to 140° C. The prepolymer produced is continuously discharged, cooled down to room temperature and collected in a storage vessel.

The monomer conversion degree is 25%; the prepolymer molecular weight is 95,000.

The prepolymer conversion degree and molecular weight practically do not change upon one month's storage.

EXAMPLE 2

0.1 part of tert.-butyl perbenzoate, 0.3 wt. parts of lauryl mercaptan and 1.0 wt. part of stearic acid are added to 100 wt. parts of ethyl methacrylate. The mixture is continuously fed under a pressure of 8 kgf/cm$^2$ and at a rate of 10 l/h into a tubular reactor heated up to 150° C. The prepolymer produced is continuously discharged from the reactor, cooled down to room temperature and collected in a storage vessel.

The monomer conversion degree is 25%; the prepolymer molecular weight is 70,000.

When the mixture feed rate is raised to 15 l/h, prepolymer with a molecular weight of 67,000 and 24% monomer conversion degree is produced. At the mixture feed rate of 20 l/h the prepolymer with a molecular weight of 69,000 and 22% monomer conversion degree is produced. Thus, monomer-prepolymer conversion depends very little upon the reaction mixture residence time in the reactor, starting with a certain mixture feed rate (20 l/h).

When storing the prepolymer during 4 months at 18°-23° C., conversion degree and molecular weight do not change, and are equal to 25% and 70000 respectively.

EXAMPLE 3

100 wt. parts of methyl methacrylate, 0.1 wt. part of tert.-butyl perbenzoate, 0.3 wt. parts of lauryl mercaptan and 2.0 wt. parts of palmitic acid are introduced into a prepolymerization reactor. A prepolymer with a molecular weight of 109,000 and 73% monomer conversion degree is produced after keeping the reaction mixture for 15 min. at 140°.

EXAMPLE 4

100 wt. parts of butyl methacrylate, 0.1 wt. part of tert.-butyl perbenzoate, 0.3 wt. part of lauryl mercaptan and 1 wt. part of stearic acid are introduced into a prepolymerization reactor. A prepolymer with a molecular weight of 78,000 and 60% monomer conversion degree is produced after keeping the reaction mixture for 15 min. at 140° C.

EXAMPLE 5

80 wt. parts of methyl methacrylate, 20 wt. parts of butyl acrylate, 0.1 wt. part of tert.-butyl perbenzoate, 0.3 wt. parts of butyl mercaptan and 1.5 parts of behenic acid are placed into a reactor. A prepolymer with a molecular weight of 120,000 and 63% monomer conversion degree is produced after keeping the reaction mixture for 15 min. at 140° C.

EXAMPLE 6

85 wt. parts of methyl methacrylate, 15 wt. parts of methyl acrylate, 0.1 wt. parts of tert.-butyl perbenzoate, 0.1 wt. part of mercaptoethyl stearate and 1.3 wt. parts of myristic acid are introduced into a prepolymerization reactor. A prepolymer with a molecular weight of 160,000 and 56% monomer conversion degree is produced after keeping the reaction mixture for 15 min. at 150° C.

EXAMPLE 7

100 wt. parts of methyl methacrylate, 0.05 wt. parts of tert.-butyl perbenzoate, 0.5 wt. parts of mercaptoethyl stearate and 0.2 wt. parts of stearic acid are introduced into a prepolymerization reactor. A prepolymer with a molecular weight of 110000 and 40% monomer conversion degree is produced after keeping the reaction mixture for 15 min. at 160° C.

EXAMPLE 8

100 wt. parts of methyl methacrylate, 0.13 wt. parts of tert.-butyl perpivalate and 0.37 wt. parts of thioglycolic acid isooctyl ester are introduced into a prepolymerization reactor. A prepolymer with a molecular weight of 85,000 and 28% monomer conversion degree is produced after keeping the reaction mixture for 13 min. at 160° C.

EXAMPLE 9

100 wt. parts of methyl methacrylate, 0.1 wt. part of tert.-butyl perbenzoate and 3.0 wt. parts of thioacetic acid are placed into a prepolymerization reactor. A prepolymer with a molecular weight of 20,000 and 30% monomer conversion degree is produced after keeping the reaction mixture for 5 min. at 140° C.

Conversion degree and molecular weight practically do not change after keeping the prepolymer for 1 hour at 140° C. and remain 32% and 22,000 respectively.

EXAMPLE 10

90 wt. parts of methyl methacrylate, 10 wt. parts of ethyl methacrylate, 0.12 wt. parts of tert.-butyl perenanthate and 3.0 wt. parts of thioglycolic acid 2-ethylhexyl ester are introduced into a prepolymerization reactor. A prepolymer with a molecular weight of 47,000 and 35% monomer conversion degree is produced after keeping the reaction mixture for 10 min. at 140° C.

EXAMPLE 11

100 wt. parts of methyl methacrylate, 0.05 wt. parts of tert.-butyl perbenzoate and 0.2 wt. parts of thiosalicylic acid are introduced into a prepolymerization reactor. A prepolymer with a molecular weight of 250,000 and 24% monomer conversion degree is produced after keeping the reaction mixture for 15 min. at 160° C.

EXAMPLE 12

100 wt. parts of methacrylate, 0.09 wt. parts of tert.-butyl perpivalate and 0.6 wt. parts of thioglycolic acid are introduced into a prepolymerization reactor. A prepolymer with a molecular weight of 80,000 and 25% monomer conversion degree is produced after keeping the reaction mixture for 15 min. at 140° C.

EXAMPLE 13

100 wt. parts of methyl methacrylate, 0.13 wt. parts of tert.-butyl perpivalate, 0.1 wt. part of lauryl mercaptan and 1.0 wt. part of thioacetic acid are placed into a prepolymerization reactor. A prepolymer with a molecular weight of 150,000 and 32% monomer conversion degree is produced after keeping the reaction mixture for 10 min. at 120° C.

EXAMPLE 14

100 wt. parts of methyl methacrylate, 0.07 wt. parts of tert.-butyl perbenzoate and 0.2 wt. parts of thioglycolic acid isooctyl ester are introduced into a prepolymerization reactor. A prepolymer with a molecular weight of 110,000 and 32% monomer conversion degree is produced after keeping the reaction mixture for 10 min. at 150° C.

EXAMPLE 15

100 wt. parts of methyl methacrylate 0.12 wt. parts of tert.-butyl perenanthate and 2.0 wt. parts of thioglycolic acid 2-ethylhexyl ester are introduced into a prepolymerization reactor. A prepolymer with a molecular weight of 47,000 and 36% monomer conversion degree is produced after keeping the reaction mixture for 10 min at 140° C.

EXAMPLE 16

90 wt. parts of methyl methacrylate, 10 wt. parts of methyl acrylate, 0.09 wt. parts of butyl perpivalate, 0.1 wt. parts of butyl mercaptan and 1.8 wt. parts of para-toluenesulfonic acid are introduced into a prepolymerization reactor. A prepolymer with a molecular weight of 160,000 and 27% monomer conversion degree is produced after keeping the reaction mixture for 15 min. at 150° C.

EXAMPLE 17

100 wt. parts of methyl methacrylate, 0.1 wt. part of tert.-butyl perbenzoate, 0.5 wt. parts of lauryl mercaptan and 0.2 wt. parts of para-toluenesulfonic acid are introduced into a prepolymerization reactor. A prepolymer with a molecular weight of 67,000 and 40% monomer conversion degree is produced after keeping the reaction mixture for 15 min. at 160° C.

EXAMPLE 18

100 wt. parts of methyl methacrylate, 0.3 wt. parts of tert.-butyl perpivalate, 0.5 wt. parts of mercaptoethyl stearate and 1.0 wt. parts of thioacetic acid are introduced into a prepolymerization reactor. A prepolymer with a molecular weight of 43,000 and 26% monomer conversion degree is produced after keeping the reaction mixture for 10 min. at 160° C.

EXAMPLE 19

90 wt. parts of methyl methacrylate, 10 wt. parts of methyl acrylate, 0.15 wt. parts of tert.-butyl enanthate, 0.35 wt. parts of lauryl mercaptan and 1.3 wt. parts of thiosalicylic acid are introduced into a prepolymerization reactor. A prepolymer with a molecular weight of 40,000 and 20% monomer conversion degree is produced after keeping the reaction mixture for 10 min. at 140° C.

EXAMPLE 20

100 wt. parts of methyl methacrylate, 0.05 wt. parts of tert.-butyl enanthate, 0.15 wt. parts of lauryl mercaptan and 0.8 wt. parts of sulfoabietic acid are introduced into a prepolymerization reactor. A prepolymer with a molecular weight of 247,000 and 20% monomer conversion degree is produced after keeping the reaction mixture for 10 min. at 120° C.

EXAMPLE 21

100 wt. parts of methyl methacrylate, 0.05 wt. parts of tert.-butyl perbenzoate and 1.5 wt. parts of thioacetic acid are introduced into a prepolymerization reactor. A prepolymer with a molecular weight of 65,000 and 28% monomer conversion degree is produced after keeping the reaction mixture for 10 min. at 140° C.

EXAMPLE 22

100 wt. parts of methyl methacrylate, 0.06 wt. parts of tert.-butyl perpivalate and 1.0 wt. parts of thioglycolic acid 2-ethylhexyl ester are introduced into a prepolymerization reactor. A prepolymer with a molecular weight of 58,000 and 24% monomer conversion degree is produced after keeping the reaction mixture for 10 min. at 150° C.

EXAMPLE 23

100 wt. parts of methyl methacrylate, 0.3 wt. parts of tert.-butyl permethyl carbitol, 0.35 wt. parts of lauryl mercaptan and 1.2 wt. parts of stearic acid are introduced into a prepolymerization reactor. A prepolymer with a molecular weight of 100,000 and 23% monomer conversion degree is produced after keeping the reaction mixture for 20 min. at 90° C.

EXAMPLE 24

100 wt. parts of methyl methacrylate, 0.3 wt. parts of tert.-butyl perbenzyl carbitol, 0.25 wt. parts of butyl mercaptan and 1.5 wt. parts of oleic acid are introduced into a prepolymerization reactor. A prepolymer with a molecular weight of 92,000 and 27% monomer conversion degree is produced after keeping the reaction mixture for 20 min. at 100° C.

EXAMPLE 25

100 wt. parts of methyl methacrylate, 0.25 wt. parts of tert.-butyl perphenyl carbitol, 0.5 wt. parts of lauryl mercaptan and 0.8 wt. parts of thioacetic acid are introduced into a prepolymerization reactor. A prepolymer with a molecular weight of 65,000 and 28% monomer conversion degree is produced after keeping the reaction mixture for 15 min. at 120° C.

EXAMPLE 26

100 wt. parts of styrene, 0.12 wt. parts of tert.-butyl perbenzoate, 0.3 wt. parts of lauryl mercaptan and 1.2 wt. parts of stearic acid are introduced into a prepolymerization reactor. A prepolymer with a molecular weight of 116,000 and 24% monomer conversion degree is produced after keeping the reaction mixture for 15 min. at 140° C.

EXAMPLE 27

100 wt. parts of styrene, 0.07 wt. parts of tert.-butyl perenanthate, 0.35 wt. parts of lauryl mercaptan and 1.0 wt. part of oleic acid are introduced into a prepolymerization reactor. A prepolymer with a molecular weight of 100,000 and 26% monomer conversion degree is produced after keeping the reaction mixture during 15 min. at 140° C.

EXAMPLE 28

90 wt. parts of styrene, 10 wt. parts of methyl methacrylate, 0.05 wt. parts of tert.-butyl perbenzoate, 0.2 wt. parts of butyl mercaptan and 1.0 wt. part of palmitic acid are placed into a prepolymerization reactor. A prepolymer with a molecular weight of 11,000 and 40% monomer conversion degree is produced after keeping the reaction mixture for 15 min. at 150° C.

EXAMPLE 29

80 wt. parts of styrene, 20 wt. parts of methyl methacrylate, 0.1 wt. part of tert.-butyl perbenzoate, 0.1 wt. part of lauryl mercaptan and 1.0 wt. part of stearic acid are introduced into a prepolymerization reactor. A prepolymer with a molecular weight of 130,000 and 53% monomer conversion degree is produced after keeping the reaction mixture for 15 min. at 140° C.

EXAMPLE 30

90 wt. parts of methyl methacrylate, 10 wt. parts of styrene, 0.1 wt. part of tert.-butyl perenanthate, 0.5 wt. parts of lauryl mercaptan and 1.0 wt. part of oleic acid are introduced into a prepolymerization reactor. A prepolymer with a molecular weight of 65,000 and 25% monomer conversion degree is produced after keeping the reaction mixture for 15 min. at 140° C.

EXAMPLE 31

90 wt. parts of methyl methacrylate, 10 wt. parts of styrene, 0.1 wt. part of tert.-butyl perbenzoate and 2.5 wt. parts of thiosalicylic acid are introduced into a prepolymerization reactor. A prepolymer with a molecular weight of 50,000 and 15% monomer conversion degree is produced after keeping the reaction mixture for 10 min. at 140° C.

EXAMPLE 32

90 wt. parts of methyl methacrylate, 10 wt. parts of styrene, 0.1 wt. part of tert.-butyl perpivalate, 0.15 wt. parts of lauryl mercaptan and 2.0 wt. parts of p-toluenesulfonic acid are introduced into a prepolymerization reactor. A prepolymer with a molecular weight of 145,000 and 32% monomer conversion degree is produced after keeping the reaction mixture for 10 min. at 150° C.

EXAMPLE 33

90 wt. parts of styrene, 10 wt. parts of ethyl methacrylate, 0.12 wt. parts of tert.-butyl perbenzoate, 0.3 wt. parts of butyl mercaptan and 1.3 wt. parts of stearic acid are introduced into a prepolymerization reactor. A prepolymer with a molecular weight of 107,000 and 28% monomer conversion degree is produced after keeping the reaction mixture for 15 min. at 140° C.

EXAMPLE 34

90 wt. parts of methyl methacrylate, 10 wt. parts of styrene, 0.08 wt. parts of tert.-butyl perpivalate, 0.25 wt. parts of lauryl mercaptan and 1.5 wt. parts of stearic acid are introduced into a prepolymerization reactor. A prepolymer with a molecular weight of 85,000 and 22% monomer conversion degree is produced after keeping the reaction mixture for 10 min. at 150° C.

EXAMPLE 35

A reaction mixture, preblown with air enriched with oxygen, consisting of 100 wt. parts of methyl methacrylate, 0.1 wt. parts of tert.-butyl perbenzoate, 0.25 wt. parts of lauryl mercaptan and 1.0 wt. part of oleic acid, is introduced into a prepolymerization reactor. A prepolymer with a molecular weight of 90,000 and 38% monomer conversion degree is produced after keeping the reaction mixture for 15 min. at 140° C.

EXAMPLE 36

A reaction mixture, preblown with air enriched with oxygen, consisting of 100 wt. parts of methyl methacrylate, 0.12 wt. parts of tert.-butyl perbenzoate, 0.28 wt. parts of lauryl mercaptan and 1.2 wt. parts of stearic acid, is introduced into a prepolymerization reactor. A prepolymer with a molecular weight of 120,000 and 56% monomer conversion degree is produced after keeping the reaction mixture for 10 min. at 140° C.

EXAMPLE 37

A reaction mixture (preblown with argon) consisting of 100 wt. parts of methylmethacrylate, 0.1 wt. part of tert.-butyl perpivalate, 0.25 wt. parts of lauryl mercaptan and 1.0 wt. part of stearic acid is introduced into a prepolymerization reactor. A prepolymer with a molecular weight of 110,000 and 30% monomer conversion degree is obtained after keeping the reaction mixture for 10 min. at 140° C.

EXAMPLE 38

A reaction mixture (preblown with nitrogen) consisting of 100 wt. parts of methyl methacrylate, 0.05 wt. parts of tert.-butyl enanthate, 0.15 wt. parts of lauryl mercaptan and 1.5 wt. parts of palmitic acid is introduced into a prepolymerization reactor. A prepolymer with a molecular weight of 135,000 and 32% monomer conversion degree is obtained after keeping the reaction mixture for 15 min at 150° C.

What is claimed is:

1. A method for producing prepolymers from vinyl monomers selected from the group consisting of methacrylic acid esters, a mixture of esters of methacrylic and acrylic acids, styrene and a mixture of styrene with methacrylic acid esters, consisting of mass polymerization of vinyl monomers selected from the group consisting of methacrylic acid esters, a mixture of esters of methacrylic and acrylic acids, styrene and a mixture of styrene with methacrylic acid esters; said polymerization being conducted at a temperature 90° to 160° C. in the medium of a gas selected from the group consisting of air, oxygen-enriched air and an inert gas, in the presence of an initiating system consisting of:

(1) peresters of the general formula

where R is aryl, alkyl, isoalkyl, methyl carbitol, phenyl carbitol or benzyl carbitol in an amount of 0.05 to 3.0 wt. parts per 100 wt. parts of said vinyl monomer and (2) the following components selected from the group consisting of:
  (a) sulfur-containing organic acids with bivalent sulfur in an amount of 0.2-3.0 wt. parts per 100 wt. parts of said vinyl monomer,
  (b) esters of sulfur-containing organic acids with bivalent sulfur in an amount of 0.2-3.0 wt. parts per 100 wt. parts of said vinyl monomer,
  (c) a mixture of mercaptans with 4 to 20 carbon atoms in the chain and sulfur-containing organic acids in an amount of 0.3-2.5 wt. parts per 100 parts of said vinyl monomer, taken in a weight ratio of 0.1-0.5:0.2.2, respectively.

2. The method of claim 1 wherein the perester initiating system is associated with sulfur-containing organic acids with bivalent sulfur in an amount of 0.2-3.0 wt. parts per 100 wt. parts of said vinyl monomer.

3. The method of claim 1 wherein the perester initiating system is associated with esters of sulfur-containing organic acids with bivalent sulfur in an amount of 0.2-3.0 wt. parts per 100 wt. parts of said vinyl monomer.

4. The method of claim 1 wherein the perester initiating system is associated with a mixture of mercaptans with 4 to 20 carbon atoms in the chain and sulfur-containing organic acids in an amount of 0.3-2.5 wt. parts per 100 parts of said vinyl monomer, taken in a weight ratio of 0.1-0.5:0.2-2, respectively.

5. The method of claim 1 wherein the polymerization is conducted in air.

6. The method of claim 1 wherein the polymerization is conducted in oxygen-enriched air.

7. The method of claim 1 wherein the polymerization is conducted in an inert gas.